United States Patent
Chen et al.

(10) Patent No.: US 8,417,053 B2
(45) Date of Patent: Apr. 9, 2013

(54) CLEANING METHOD FOR FOGGY IMAGES

(75) Inventors: Chao-Ho Chen, Tai-Nan (TW); Wen-Wei Tsai, Yilan County (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 231 days.

(21) Appl. No.: 12/793,707

(22) Filed: Jun. 4, 2010

(65) Prior Publication Data

US 2011/0135200 A1    Jun. 9, 2011

(30) Foreign Application Priority Data

Dec. 4, 2009    (TW) .............................. 98141501 A

(51) Int. Cl.
*G06K 9/40*    (2006.01)
*G06K 9/00*    (2006.01)

(52) U.S. Cl. .......................... 382/274; 382/167; 382/169

(58) Field of Classification Search .................. 382/167, 382/254, 274, 275
See application file for complete search history.

(56) References Cited

U.S. PATENT DOCUMENTS

| | | | |
|---|---|---|---|
| 6,853,747 B1 * | 2/2005 | Matsuura et al. | 382/167 |
| 2009/0022395 A1 * | 1/2009 | Cho et al. | 382/167 |
| 2010/0040300 A1 * | 2/2010 | Kang et al. | 382/255 |

OTHER PUBLICATIONS

Q. Wang and R. K. Ward, "Fast Image/Video Contrast Enhancement Based on Weighted Thresholded Histogram Equalization," May 2007, IEEE Transactions on Consumer Electronics, vol. 53, Issue 2, p. 757-764.*

Narasimhan, "Vision and the Atmosphere," International Journal of Computer Vision, vol. 48, No. 3, pp. 233-254, Aug. 2002.

Narasimhan, "Contrast Restoration of Weather Degraded Images", IEEE Transactions on Pattern Analysis and Machine Intelligence, vol. 25, No. 6, pp. 713-724, 2003.

Narasimhan, "Interactive (De)Weathering of an Image using Physical Models," Proceedings of the ICCV workshop on Color and Photometric Methods in Computer Vision, pp. 1387-1394, 2003.

Tan, "Visibility Enhancement for Roads with Foggy or Hazy Scenes," IEEE Intelligent Vehicles Symposium, pp. 19-24, Jun. 2007.

Tan, "Visibility in Bad Weather from a Single Image", IEEE Conference on Computer Vision and Pattern Recognition, pp. 1-8, Jun. 2008.

Aubert, "Contrast Restoration of Foggy Images through use of an Onboard Camera," IEEE Conference on Intelligent Transportation Systems, pp. 1090-1095, Sep. 2005.

(Continued)

*Primary Examiner* — Stephen R Koziol
*Assistant Examiner* — Timothy Choi
(74) *Attorney, Agent, or Firm* — Winston Hsu; Scott Margo

(57) ABSTRACT

Determining if an input image is a foggy image includes determining an average luminance gray level of the input image, performing Sobel image processing on the input image to generate a Sobel image of the input image when the average luminance gray level of the input image is between a first image average luminance and a second image average luminance, determining a first normalization value and a second normalization value of the input image, determining a mean value and a standard deviation of the Sobel image when the first normalization value and the second normalization value are less than a first threshold value, and determining the input image as a foggy image when a sum of the mean value and the standard deviation is less than a second threshold value.

4 Claims, 10 Drawing Sheets

OTHER PUBLICATIONS

Murase, "Recognition of foggy conditions by in-vehicle camera and millimeter wave radar", 2007 IEEE Intelligent Vehicles Symposium, vol. 3, No. 5, pp. 87-92, Jun. 2007.

Schechner, "Polarization-based vision through haze", Applied Optics, vol. 42, No. 3, pp. 511-525, Jan. 2003.

Fattal, "Single image dehazing", International Conference on Computer Graphics and Interactive Techniques, No. 72, pp. 1-9, 2008.

Mori, Visibility Estimation in Foggy Conditions by In-vehicle Camera and Radar, ICICIC2006, pp. 548-551, Beijing China, Aug. 30-Sep. 1, 2006.

\* cited by examiner

| -1 | 0 | 1 |
|---|---|---|
| -2 | 0 | 2 |
| -1 | 0 | 1 |

| -1 | -2 | -1 |
|---|---|---|
| 0 | 0 | 0 |
| 1 | 2 | 1 |

| Z1 | Z2 | Z3 |
|---|---|---|
| Z4 | Z5 | Z6 |
| Z7 | Z8 | Z9 |

FIG. 4

| δ \ S_μ | Level(7) | Level(6) | Level(5) | Level(4) | Level(3) | Level(2) | Level(1) |
|---|---|---|---|---|---|---|---|
| Level(7) | 7 | 6 | 5 | 3 | 1 | 1 | 1 |
| Level(6) | 7 | 5 | 3 | 1 | 1 | 1 | 1 |
| Level(5) | 6 | 4 | 1 | 1 | 1 | 1 | 1 |
| Level(4) | 4 | 2 | 1 | 1 | 1 | 1 | 1 |
| Level(3) | 2 | 1 | 1 | 1 | 1 | 1 | 1 |
| Level(2) | 1 | 1 | 1 | 1 | 1 | 1 | 1 |
| Level(1) | 1 | 1 | 1 | 1 | 1 | 1 | 1 |

FIG. 8

CLEANING METHOD FOR FOGGY IMAGES

BACKGROUND OF THE INVENTION

1. Field of the Invention

The present invention relates to cleaning methods for foggy images, and more particularly to a cleaning method for foggy images based on atmospheric scattering theory and color analysis.

2. Description of the Prior Art

In recent years, economic growth has spurred an increased interest in transportation issues. As roadway monitoring systems adopt computer visualization and image processing techniques more widely, traffic volume is steadily increasing, leading to research and development of all types of transportation-related technologies. Among a great volume of traffic-monitoring research, an Intelligent Transportation System (ITS) is one method utilized to solve traffic problems. ITS incorporates communications, control, electronics, and information technologies to put limited traffic data to its greatest use, so as to improve transportation safety, improve quality of life, and enhance economic competitiveness. ITS technologies include microelectronics technology, automated artificial intelligence, sensor technology, communications systems, and control. One of the most important ITS technologies is computer visualization. Because ITS' effective operation relies on accurate, real-time traffic monitoring parameters, not only does application of image processing and computer visualization techniques lower cost (by greatly reducing labor costs) and also make for easy installation, image processing and computer visualization techniques also provide measurement and monitoring of larger areas, so as to obtain more diverse information. In addition to capturing traditional traffic parameters, such as traffic volume and speed, ITS further detects traffic jams and traffic causes, or anticipates traffic accidents.

However, due to the influence of foggy conditions brought about by seasonal weather, because visibility is reduced when computer visualization is utilized for traffic monitoring, images captured may be unclear, making the images unrecognizable, and keeping the computer visualization application from being able to obtain accurate color information during processing. Meteorology teaches that the condensation processes of fog and clouds are similar, both occurring through cooling. However, the reasons for cooling are different in fog and clouds. Fog has many types, and forms for different reasons. The physical processes and conditions for forming fog are also very complex. Fog on a coast or on an ocean is typically advection fog, whereas fog on land or on a mountain is typically radiation fog.

Fog is one of the most influential types of weather in transportation and everyday life. Fog affects visibility in the surrounding environment, obstructing traffic control systems. For example, air traffic control towers, road traffic monitors, and harbor ship controllers are all affected by fog, which increases danger. In addition to traffic control, equipment that relies on the aid of monitoring systems is also affected, which greatly reduces the value of image monitoring systems.

Currently, many authors have introduced foggy image restoration methods, including at least the following:

[1] Srinivasa G. Narasimhan and Shree K. Nayar, "Vision and the Atmosphere," International Journal of Computer Vision, Vol. 48, No. 3, pp. 233-254, August 2002.

[2] Srinivasa G. Narasimhan and Shree K. Nayar, "Contrast Restoration of Weather Degraded Images", IEEE Transactions on Pattern Analysis and Machine Intelligence, Vol. 25, No. 6, pp. 713-724, 2003.

[3] Srinivasa G. Narasimhan and Shree K. Nayar, "Interactive (De) Weathering of an Image using Physical Models," Proceedings of the ICCV workshop on Color and Photometric Methods in Computer Vision, pp. 1387-1394, 2003.

[4] Robby T. Tan, Niklas Pettersson and Lars Petersson, "Visibility Enhancement for Roads with Foggy or Hazy Scenes," IEEE Intelligent Vehicles Symposium, pp. 19-24, June 2007.

[5] Robby T. Tan, "Visibility in Bad Weather from a Single Image", IEEE Conference on Computer Vision and Pattern Recognition, pp. 1-8, June 2008.

[6] Didier Aubert and Nicolas Hautiere, "Contrast Restoration of Foggy Images through use of an Onboard Camera," IEEE Conference on Intelligent Transportation Systems, pp. 601-606, September 2005.

[7] Hiroshi Murase, Kenji Mori, Ichiro Ide, Tomokazu Takahashi, Takayuki Miyahara and Yukimasa Tamatsu, "Recognition of foggy conditions by in-vehicle camera and millimeter wave radar", 2007 IEEE Intelligent Vehicles Symposium, Vol. 3, No. 5, pp. 87-92, June 2007.

[8] Yoav Y. Schechner, Srinivasa G. Narasimhan, and Shree K. Nayar "Polarization-based vision through haze", Applied Optics, Vol. 42, No. 3. January 2003.

[9] R. Fattal, "Single image dehazing", International Conference on Computer Graphics and Interactive Techniques, No. 72, pp. 1-9, 2008.

[10] Kenji Mori, Terutoshi Kato, Tomokazu Takahashi, Ichiro Ide, Hiroshi Murase, Takayuki Miyahara, Yukimasa Tamatsu, "Visibility Estimation in Foggy Conditions by In-vehicle Camera and Radar", ICICIC2006, pp. 548-551, Beijing China, 2006/8/30-9/1.

To remove fog from images, related research in recent years includes utilizing atmospheric scattering theory to calculate original parameters formed by image fogging, then utilizing the original parameters to perform an anti-derivative restoration to remove fog from the image. [1] and [2] utilize two images captured at the same place at two different times to obtain different depth information in the two images, then filter out fog based on the depth information. However, this technique requires two images of the environment taken at two different times to perform correction on the image that is already affected by fog. The user first needs to obtain background information for the two images, which makes the method impractical for use with processing of unknown environments.

Another method proposed in [3], [4], and [5] utilizes a depth estimate to find a vanishing point, then utilizes the vanishing point to perform filtering. In [3], a vanishing point region is selected, airlight is calculated from the vanishing point region, and depth heuristics are utilized to calculate depth d. A scattering coefficient $\beta$ is entered manually. Thus, for use in real-time image/video display applications, an appropriate scattering coefficient $\beta$ must be calculated to degrade the foggy image. In this way, different scattering coefficients $\beta$ and depths d can be chosen to reduce the influence of fog on the image. However, calculating appropriate values for the scattering coefficient $\beta$ and the depth d is difficult. In [4], chromaticity is separated into image chromaticity, light chromaticity, and object chromaticity. Image chromaticity refers to chromaticity captured when a camera captures an image. Light chromaticity refers to light coefficients extracted from the object shined on by light. Object chromaticity refers to an object image obtained after extracting the light coefficients. The method of [4] uses these three chromaticities to perform calculation. The most important part of this method is calculating chromaticities. By calculating the chromaticities, a new chromaticity can be derived. The new chromaticity is obtained through an inverse chromaticity-light space technique. When performing inverse chromaticity-light space processing, the derived result is projected onto Hough space, thereby obtaining suitable light and chromaticity coefficients, before removing the influence of fog. However, in regards to processing speed, all image information must first be projected onto the Hough space of chromaticity-light space during processing of chromaticity-light space. Then, angular calculations are used to obtain appropriate cancelling coefficients, which must be calculated for red, green, and blue (RGB). Thus, a large number of calculations are required, making the method impractical for real-time applications, not to mention that the method introduces an image chromaticity bias.

Image chromaticity, light chromaticity, and object chromaticity are also used in [5] for performing fog removal. First, an image region having greatest contrast must be obtained, then fog removal may be performed. The method utilizes a Markov Random Field to obtain airlight. The method requires approximately five to seven minutes to restore a 640×480 pixel image, making the method unsuitable for real-time applications. In light of traffic monitoring systems requiring real-time processing, image processing speed should be improved while still obtaining a good real-time image cleaning effect.

In [6], a black-and-white camera is mounted on an automobile windshield for performing fog removal processing on images of the road ahead. The camera is first calibrated, and distances between the camera and the nearest and farthest points are obtained. Road width is measured according to road markings, and an extinction coefficient β and a distance d of the image are substituted into a contrast restoration equation. However, this method is ineffective when no road markings are available, e.g. when traveling on the water. Further, a scene captured by the automobile camera will change over time. If the furthest point on the road changes (which occurs frequently), the distance obtained in the method must be adjusted. Thus, adaptive distance tracking must be considered. The method is described for a black-and-white camera. If the method were used in a color camera, the RGB color information will change as the distance changes, causing incongruity of the colors of the image, making the method unsuitable for use in color cameras.

In [7], an image shot by an automobile camera is utilized, and a preceding vehicle in front of the automobile is segmented out of the image. A distance measurement machine of a millimeter-wave radar (mm-W radar) is used to measure distance information between the automobile camera and the preceding vehicle. The method uses machine measurement and variance to measure distance d, uses the distance d to obtain an extinction coefficient β, then performs contrast restoration. Although this method can make effective use of the machine measurement, the method requires a preceding object, such as the preceding vehicle, to obtain the distance measurement. If the scene changes, the distance obtained may not lead to an accurate extinction coefficient β. When traveling on the water, the camera is unable to select a reference object analogous to the preceding vehicle due to heavy waves. Thus, this method would be ineffective if applied to a ship with a camera mounted thereon.

In [8], a polarizing filter is utilized for performing fog removal. However, this method requires two different images, and calculation of a worst polarization and a best polarization, or calculation of a polarizer angle of the image, in order to perform fog removal. Thus, if only one image is available, this method is unusable.

The method of [9] first calculates a degree of change of an image, then utilizes atmospheric scattering theory to perform fog removal. However, the method requires 35 seconds to process one image, making the method unusable in real-time monitoring systems.

In [10], a discrete cosine transform (DCT) is performed based on fog thickness classifications. Then, fog heaviness in the image is classified through high/low-frequency information and Manhattan distance. However, this method is only directed at one particular region of the image, and is not directed to classification of the entire image.

SUMMARY OF THE INVENTION

According to one embodiment, a method for determining if an input image is a foggy image includes determining an average luminance gray level of the input image, performing Sobel image processing on the input image to generate a Sobel image of the input image when the average luminance gray level of the input image is between a first image average luminance and a second image average luminance, determining a first normalization value and a second normalization value of the input image, determining a mean value and a standard deviation of the Sobel image when the first normalization value and the second normalization value are less than a first threshold value, and determining the input image as a foggy image when a sum of the mean value and the standard deviation is less than a second threshold value.

According to another embodiment, a method for determining a foggy level of an input image comprises determining an average luminance gray level of the input image, performing Sobel image processing on the input image to generate a Sobel image of the input image when the average luminance gray level of the input image is between a first image average luminance and a second image average luminance, determining a first normalization value and a second normalization value of the input image, determining a mean value and a standard deviation of the Sobel image when the first normalization value and the second normalization value are less than a first threshold value, determining the input image being a foggy image when a sum of the mean value and the standard deviation is less than a second threshold value, determining a level of the mean value and a level of the standard deviation when the mean value and the standard deviation are less than a value of a fog level, and using the level of the mean value and the level of the standard deviation look up the fog level in a fog level look-up table for obtaining the fog level of the input image.

According to another embodiment, a cleaning method for foggy images comprises using a stimulus value of a light chromaticity (LC) of an input image to generate an airlight luminance, using red-green-blue (RGB) tristimulus values of the input image to generate an attenuation coefficient, using the airlight luminance and the attenuation coefficient to recover the input image for generating a primary reduction image, transforming the primary reduction image into YCbCr color model and boosting values of Cb and Cr values of the primary reduction image to enhance chromaticity of the primary reduction image, redistributing weighting of a probability density function of an RGB gray level histogram after enhancing chromaticity of the primary reduction image, and enhancing luminance of the primary reduction image through histogram equalization after enhancing chromaticity of the primary reduction image to generate a final reduction image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a Sobel filter mask.

FIG. 8 is a table for determining fog level.

DETAILED DESCRIPTION

Figure 1:
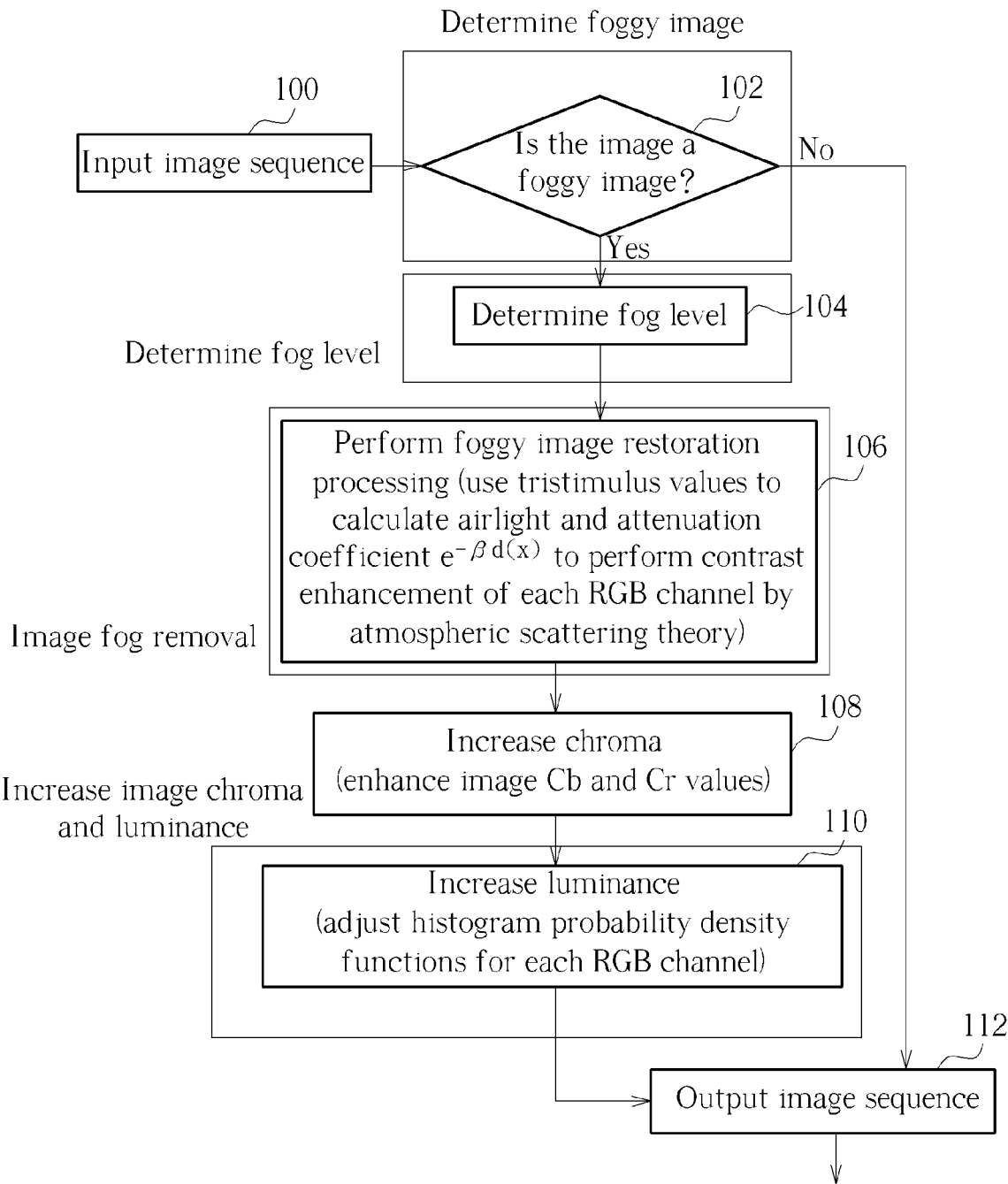
FIG. 1 is a flowchart of a cleaning method for foggy images according to one embodiment.

Please refer to FIG. 1, which is a flowchart of a cleaning method according to one embodiment. First, it is determined whether the image is a foggy image. If so, a fog level of the image is calculated. Then, color change of the foggy image is analyzed, and the influence of the fog is removed. Foggy images may have insufficient color, so that the image may have a dark bias or a color bias after removing the fog. Thus, chromaticity is increased in the image after fog removal. Then, visibility of the image is increased. In this way, a foggy image can be cleaned through use of the cleaning method.

The method may be applied in specific transportation domains, e.g. for ships entering or leaving a port, for automobiles travelling along roads, and in airport control towers for planes taking off or landing, to increase safety in low-visibility environments. Additionally, the cleaning method may be utilized in pre-processing stages of intelligent transportation digital video recorder (DVR) systems, including vision recognition functions. The cleaning method may be combined with a database, and restored images may be utilized in segmenting key moving objects for visual recognition processing in a later stage, so as to aid transportation (marine or roadway) intelligent visual monitoring processing.

Figure 2:
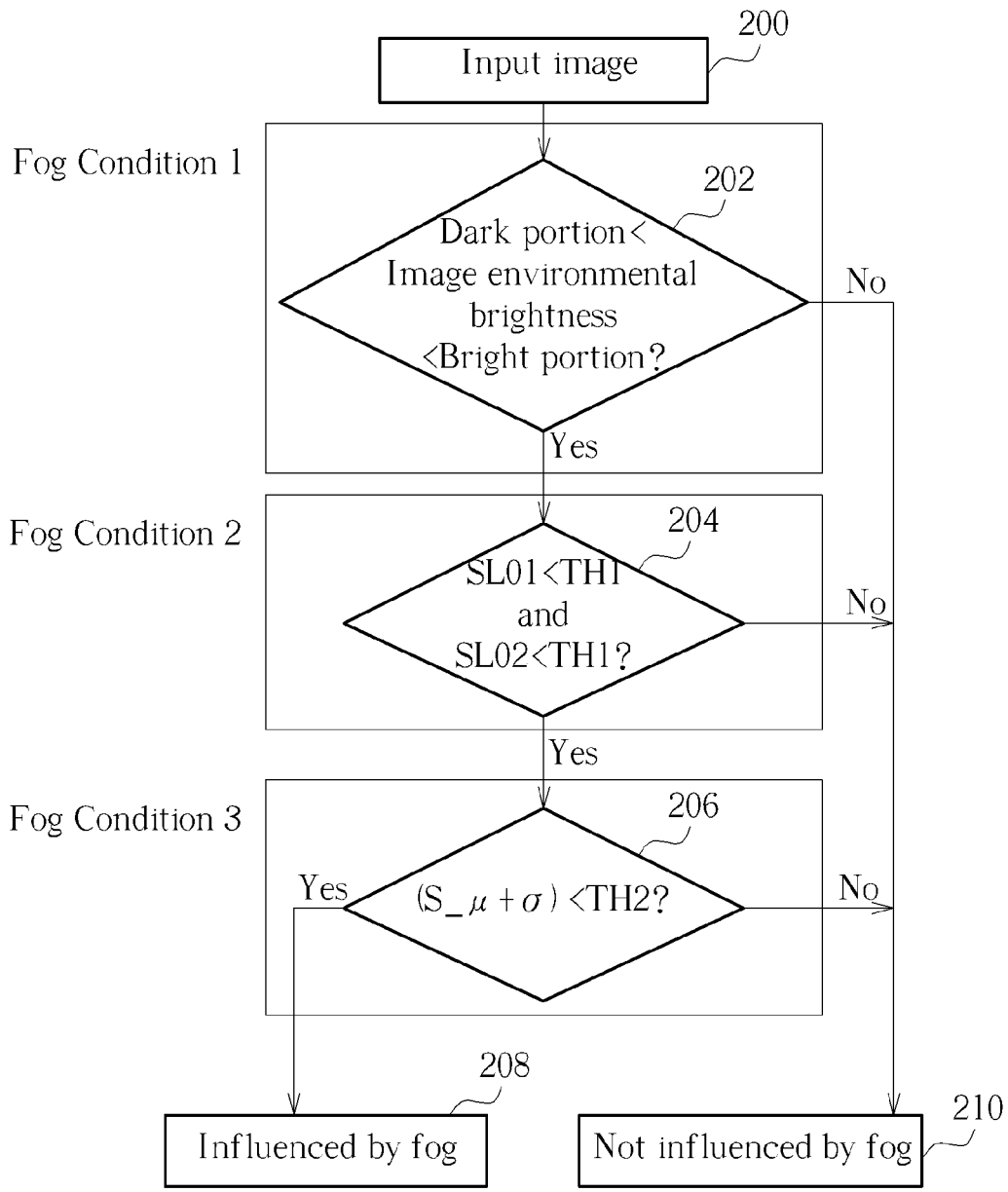
FIG. 2 is a flowchart of foggy image determination.

Images captured by the camera are not necessarily foggy images, so the cleaning method may utilize three determination criteria to decide whether the images captured by the camera are foggy images. FIG. 2 is a flowchart illustrating foggy image determination.

1.1 Analyzing Environmental Brightness of Image

Figure 3:
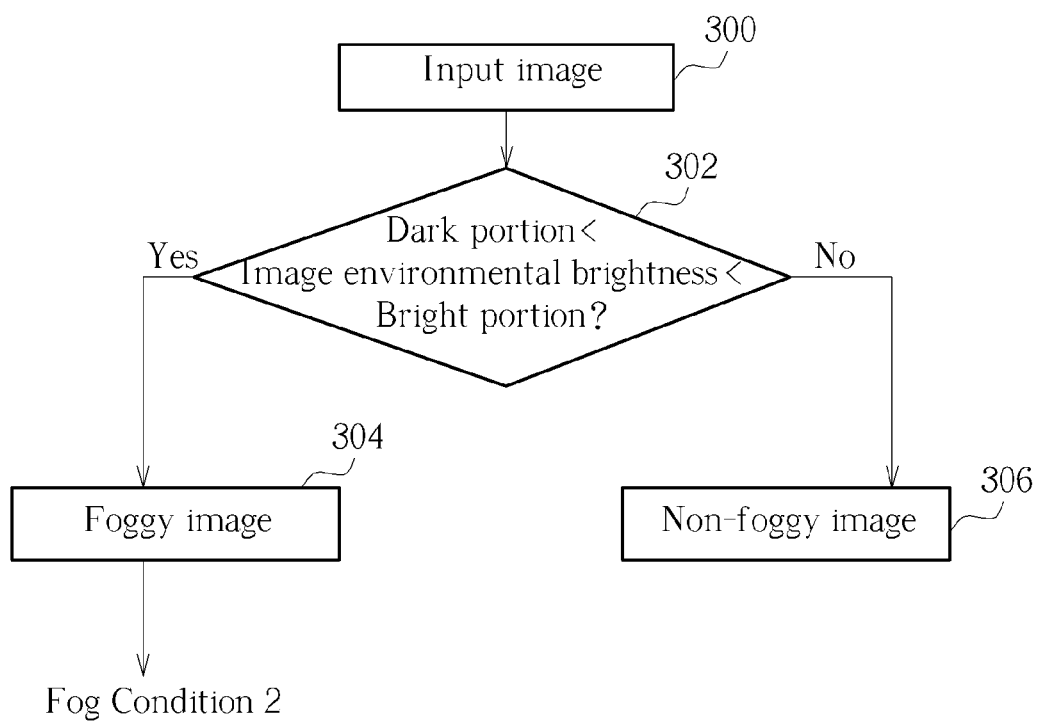
FIG. 3 is a flowchart of utilizing brightness to perform foggy image determination.

First, the cleaning method determines whether the captured image is a foggy image by analyzing brightness of the captured image according to Condition 1. Average brightness of images produced in a foggy environment is not too dark, and not too bright. Based on analysis, average brightness of most foggy images corresponds to a gray level in a range of 100 to 200. Histogram variation is typically between 63 and 191. Thus, through this analysis, one condition for the captured image to be a foggy image is having average brightness within a predefined range. A histogram of the captured image may be utilized to determine gray-level brightness distribution from dark to bright. Average brightness of the captured image lower than 31 can be called a "dark portion", and average brightness of the captured image greater than 223 can be called a "bright portion". Through analysis, it can be seen that foggy images have average brightness between 100 and 200. Thus, conformance to Condition 1 (in FIG. 2) is determined by analyzing the captured image for influence of fog through average brightness. FIG. 3 is a flowchart of utilizing average brightness to perform foggy image determination.

1.2 Analyzing Edge Number of Sobel Image

The Sobel operator is used primarily for detecting edges in images, and employs partial derivative operation principles to establish a gradient image for the entire image. A resulting image after processing by the Sobel operator is called an edge image. A Sobel filter comprises two masks: a horizontal mask Gx (along the X-axis), and a vertical mask Gy (along the Y-axis), which detect edge changes in the X- and Y-directions, respectively, as shown in FIG. 4.

Figure 5:
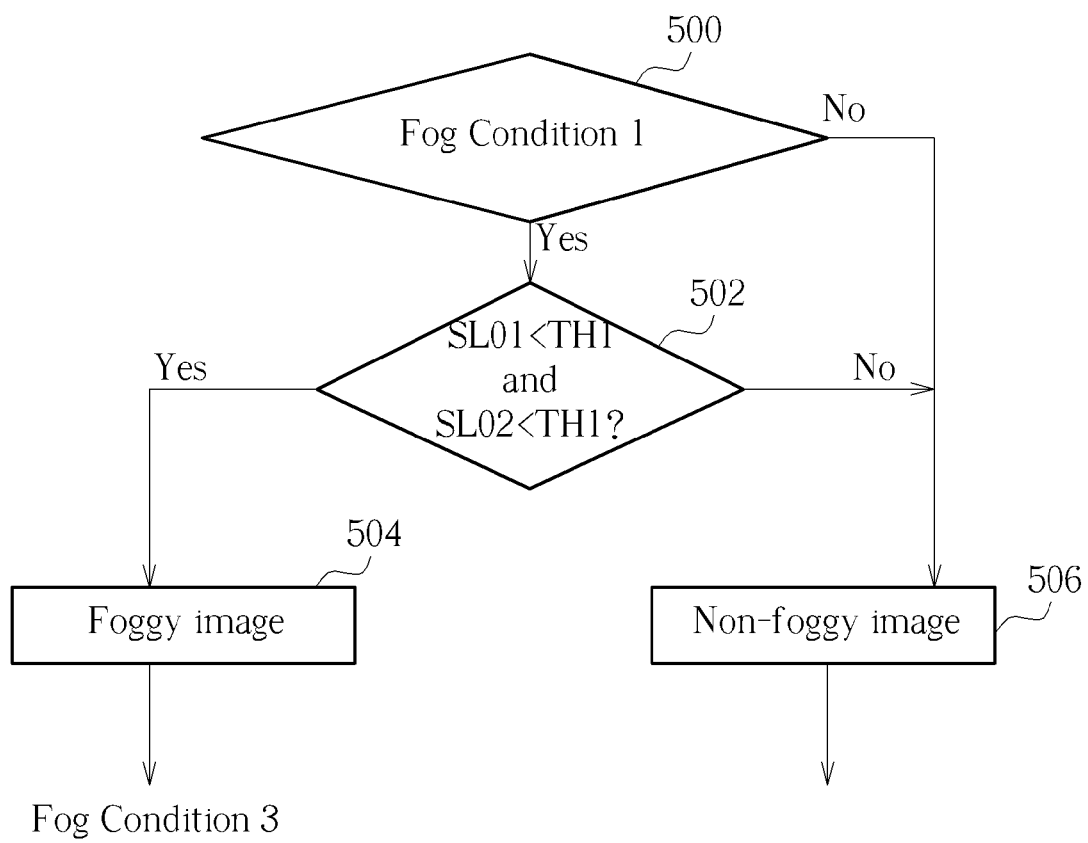
FIG. 5 is a flowchart of utilizing Sobel edge image characteristics to perform foggy image determination.

When utilizing Sobel image edge gradient change to analyze differences between foggy images and non-foggy images, Sobel image edge pixel gray levels can be seen as between 250 and 255 through analyzing a probability density function of the Sobel image histogram. Increase in average number of pixels of the Sobel image having gray level either between 250 and 255 or equaling 255 represents that the Sobel image is a non-foggy image. Decrease in the average number represents that the Sobel image is a foggy image. Thus, when the number of pixels having gray level either between 250 and 255 or equaling 255 is greater than a first threshold, the Sobel image is a non-foggy image; when the number is less than a second threshold, the Sobel image is a foggy image. In the above, the range of 250 to 255 and the value 255 are utilized to prevent wrong determinations. Because images sizes may vary, normalization is performed on the average number of pixels by dividing by the image size. Normalized Sobel light equations for the two categories of pixels described above (gray level between 250 and 255 and equaling 255) are as follows:

$$SL01 = Sobel\_light\_250\_to\_255/Image\_size \qquad (1)$$

$$SL02 = Sobel\_light\_255/Image\_size \qquad (2)$$

where Image_size represents size of the image, Sobel_light_250_to_255 represents number of pixels having gray level between 250 and 255, and Sobel_light_255 represents number of pixels having gray level equaling 255. Fog is present if SL01 and SL02 of equations (1) and (2) are less than the first threshold TH1. FIG. 5 shows a flowchart of utilizing Sobel edge image characteristics to perform foggy image determination.

1.3 Analyzing Sobel Image Mean and Standard Deviation

A foggy environment leads to images having low visibility. Thus, a foggy image is blurry and unclear. From the standpoint of image processing, the image is smooth, whereas a clear image is a complex image. Thus, the image can be determined as a foggy image by using the Sobel edge detection method to analyze gradient change of the foggy image, then obtaining a mean and standard deviation of the image after Sobel processing. Utilizing a Sobel filter mask (FIG. 4), a pixel mean of the image after Sobel filtering is:

$$S\_\mu = \frac{\sum_{i=1}^{n*m} S\_P_i}{n*m} \qquad (3)$$

where $S\_\mu$ is mean of the entire Sobel image, $S\_P_i$ is each pixel of the Sobel image, and $n*m$ is image size. Gradient change of a Sobel image of a foggy image is relatively scattered, whereas gradient change of a Sobel image of a non-foggy image is relatively apparent.

The standard deviation may represent deviation from the mean of the entire image. The larger the standard deviation, the greater the change in pixel values of the image, implying greater contrast. The smaller the deviation, the less the change in pixel values of the image, implying lower contrast. First, the mean of the entire image is calculated, and degree of change of the mean for foggy images and non-foggy images is analyzed. The larger the mean is, the brighter the average brightness of the image; the smaller the mean is, the darker the average brightness. The following equation can be used to calculate the mean:

$$\mu = \frac{\sum_{i=1}^{n*m} P_i}{n*m} \tag{4}$$

where $\mu$ represents the mean of the entire image, $P_i$ represents one pixel of the original image, and $n*m$ represents image size. Using the mean $\mu$, the following equation can be used to find the standard deviation:

$$\sigma = \frac{\sqrt{\sum_{i=1}^{n*m}(P_i - \mu)}}{n*m}. \tag{5}$$

Figure 6:
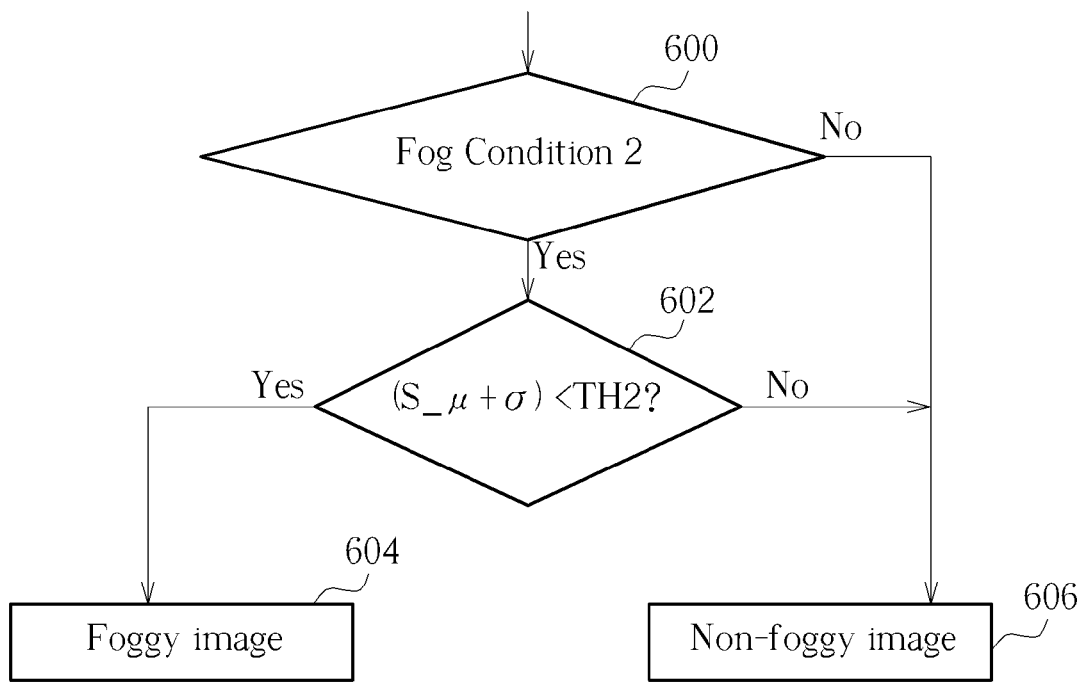
FIG. 6 is a flowchart of utilizing a mean and a standard deviation of a Sobel image to perform foggy image determination.

Using the Sobel image, calculating the mean S_$\mu$ thereof and the standard deviation $\sigma$ of the entire image, a third condition Condition 3 can be established. As shown in FIG. 6, if (S_$\mu$+$\sigma$)<TH2 (where TH2 is a second threshold), the image is a foggy image; else the image is a non-foggy image.

Thus, through use of the above three conditions (Conditions 1, 2, and 3), it can be determined whether the image is a foggy image. Fog removal is only performed when the image is a foggy image. When the image is a non-foggy image, fog removal is not performed, keeping the original image.

Different types of fog exhibit different influence for different weather conditions. Gradient change of a foggy image after Sobel operator processing is relatively smooth, whereas gradient change of a non-foggy image after Sobel operator processing is relatively apparent. The Sobel image mean S_$\mu$ and the original image standard deviation $\sigma$ are utilized to determine fog level of the image, where S_$\mu$ represents amount of edge information in the image, and $\sigma$ represents pixel value change of the image. A flowchart of fog level determination is shown in FIG. 7.

Figure 7:
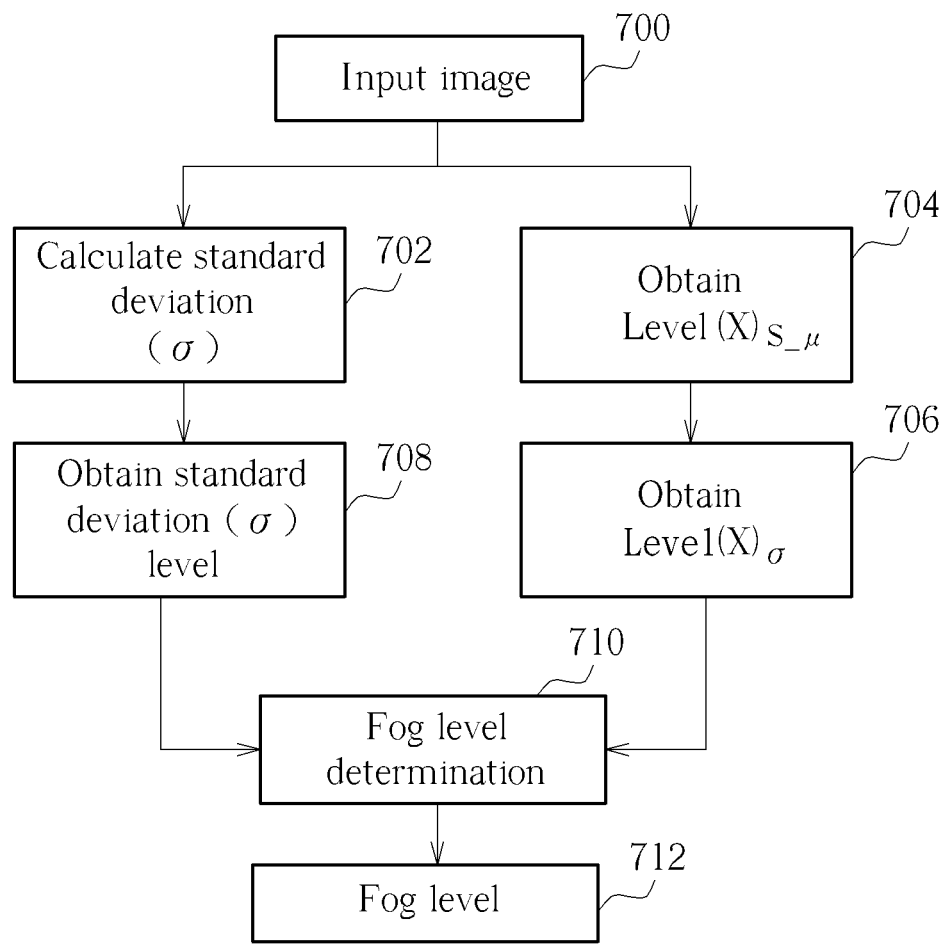
FIG. 7 is a flowchart of fog level determination.

As shown in FIG. 7, the following steps are utilized to perform fog level determination:

Step 700: Input an image;
Step 702: Calculate standard deviation $\sigma$;
Step 704: Calculate Sobel image mean S_$\mu$;
Step 706: If S_$\mu$ is less than or equal to Z, then Level$(x)_{S\_\mu}$;
Step 708: If $\sigma$ is less than or equal to Z, then Level$(x)_o$;
Step 710: Determine fog level as Fog_Level= FD(Level$(x)_{S\_\mu}$, Level$(x)_o$); and
Step 712: Obtain fog level.

where size of Z determines level of S_$\mu$ (Level$(x)_{S\_\mu}$) and level of 6 (Level$(x)_o$). Z in a range of 0 to 15 corresponds Level(7); Z in a range of 16-30 corresponds to Level(6); Z in a range of 31-45 corresponds to Level (5); Z in a range of 46-60 corresponds to Level (4); Z in a range of 61-75 corresponds to Level (3); Z in a range of 76-90 corresponds to Level (2); Z greater than 91 corresponds to Level(1). The lower Level (x) is, the more edge information present in the image, where a represents greater change of pixel value of the image. The equation for FD utilizes Level$(x)_{S\_\mu}$ and Level $(x)_o$ to determine Fog_Level of the original image. Fog level is determined according to the table shown in FIG. 8. A number in each cell represents a fog level. The fog levels range from 1 to 7, with 7 levels, the $7^{th}$ level representing an image with heavy fog degradation, and the $1^{st}$ level representing an image with little or no fog degradation. Fog level is an indicator for determining thickness of fog. Analysis of the fog level gives a worker using the image a measurement of degree of the fog's influence on the environment obtained from the captured image, and can be utilized as a basis for later processing.

It is known from Lambert-Beer's Law that when parallel rays of single-colored light pass through an object (gas, solid) having even absorption, part of the light is absorbed by the object, part of the light passes through the object, and part of the light is reflected by the absorbing surface. Simply stated: particles are able to absorb ultraviolet light and visible light, and absorption strength is directly proportional to concentration of the particles. This relationship leads to fog degradation in images due to moisture particles in the atmosphere affecting light, and this relationship is related to atmospheric scattering theory.

3.1 Formation of Foggy Images

In foggy weather, the atmosphere is full of fog particles that interfere with a normally pure image, such that an image captured by a camera is affected by atmospheric scattering and airlight, a degraded image is obtained, which forms a "foggy image" displayed in a display. As distance increases, the image information received becomes weaker, which makes object recognition in the image less clear, and accurate object information harder to come by in image processing. Because attenuation factors and airlight are influential under the influence of fog particles, the degraded image E(x) may obtain a degraded linear combination through an attenuation coefficient and airlight, as follows:

$$E(x)=Ed(x)+Ea(x) \tag{6}$$

$$Ed(x)=E\infty(x)\rho(x)e^{-\beta d(x)} \tag{7}$$

$$Ea(x)=E\infty(x)(1-e^{-\beta d(x)}) \tag{8}$$

where Ed(x) represents emitted light of scenery obtained after atmospheric scattering, which is visibility attenuation of the image. Ea(x) represents scattered light generated by suspended particles in the atmosphere, which is airlight. E∞(x) represents airlight brightness under atmospheric scattering, and $\rho(x)$ represents normalized radiance of an image, which is a reflection coefficient of the scene. $\beta$ represents an atmospheric attenuation coefficient, and d(x) represents distance between the camera and the object. The foggy image E(x) is generated through the linear combination of Ed(x) and Ea(x).

It can be determined from the above that a foggy image is generated through the atmospheric attenuation coefficient $\beta$, the airlight brightness E∞(x), and the distance d(x). Thus, in order to restore the foggy image, these three coefficients may be estimated. Through reverse derivation of the above linear attenuation equations, a restoration equation can be found as follows:

$$E_\infty(x)\rho(x) = [E(x) - E_\infty(x)(1 - e^{-\beta d(x)})]\frac{1}{e^{-\beta d(x)}} \quad (9)$$

However, in one image, because it is impossible to accurately obtain β, E∞(x), and d(x), these values must be estimated from information of the image. The degraded image has an attenuation mode formed of surface coefficients and atmospheric scattering coefficients of the object. If combined with an RBG color model, a dichromatic atmospheric scattering model, such as that shown in FIG. 9, may be used.

Figure 9:
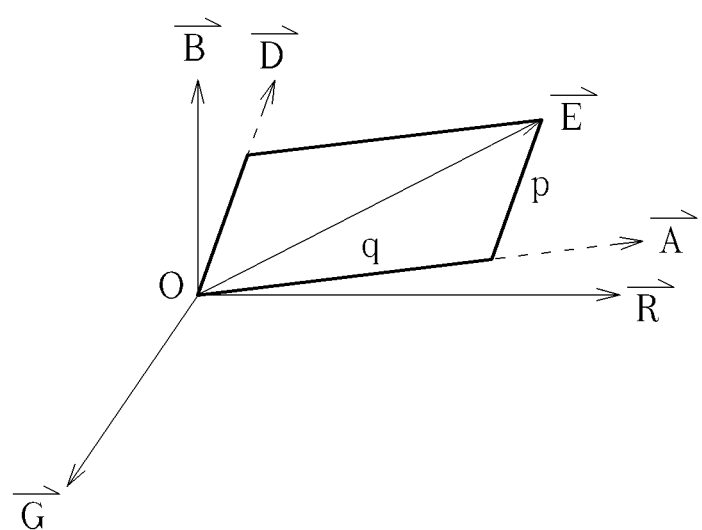
FIG. 9 is a diagram of a dichromatic atmospheric scattering model.

In FIG. 9, $\vec{R}$, $\vec{G}$, and $\vec{B}$ represent vector coordinates of the three component colors, and $\vec{D}$ represents unit vector information of the image information in the scene in the absence of atmospheric scattering. $\vec{A}$ represents unit vector information of regions in the image reached by light in the foggy environment. Assuming their brightness has the same optical spectrum scattering for both cloudless and foggy weather, equation (6) can be rewritten as equation (10):

$$E(x) = pD + qA \quad (10)$$

where D and A represent magnitudes of the vectors $\vec{D}$ and $\vec{A}$, respectively, p represents amount of direct transmission, namely $E_\infty(x)\rho(x)e^{-\beta d(x)}$, and q represents amount of airlight, namely $E_\infty(x)(1-e^{-\beta d(x)})$. Thus, assuming D and A are constant, atmospheric attenuation information may be obtained accordingly, as shown in equation (6). Thus, after interpretation through the RGB model and atmospheric scattering theory, the embodiment utilizes the three chromaticity coefficients (RGB) to enhance visibility of the foggy image.

3.2 Improving Visibility Enhancement

Through atmospheric scattering theory, affect of airlight and fog particles can be found. Then, based on the dichromatic atmospheric scattering model, the image may be analyzed into image chromaticity (IC), light chromaticity (LC), and object chromaticity (OC). Then, tristimulus values can be used to obtain three different chromaticities of each RGB channel. First, in defining image chromaticity coefficients, because RGB channel pixel values of an original image are combined to form color information through a specific color ratio, the tristimulus values IC(x) of the RGB channels can be found through the definition of equation (11).

$$IC_{(c)}(x) = \frac{E_{(c)}(x)}{E_{(r)}(x) + E_{(g)}(x) + E_{(b)}(x)} \quad (11)$$

In equation (11), subscript (c) represents color channel, namely the three RGB channels: R, G, and B. In the linear combination (equation (6)) of atmospheric scattering attenuation, defining d(x) as infinity, such that $e^{-\beta d(x)}$ goes to zero, a brightness/chromaticity stimulus value LC(x) can be found as:

$$LC_{(c)}(x) = \frac{E_{\infty(c)}(x)}{E_{\infty(r)}(x) + E_{\infty(g)}(x) + E_{\infty(b)}(x)} \quad (12)$$

If $e^{-\beta d(x)}$ is assumed to equal 1, from equation (6), it can be seen that light is removed from the image, and an object chromaticity stimulus value OC(x) can be defined as:

$$OC_{(c)}(x) = \frac{E_{\infty(c)}(x)\rho_{(c)}(x)}{E_{\infty(r)}(x)\rho_{(r)}(x) + E_{\infty(g)}(x)\rho_{(g)}(x) + E_{\infty(b)}(x)\rho_{(b)}(x)} \quad (13)$$

Thus, equation (6) can be redefined as:

$$E(x) = B(x)*OC_{(c)}(x) + F(x)*LC_{(c)}(x) \quad (14)$$

where B(x) and F(x) represent scalars having equations:

$$B(x) = [E_{\infty(r)}(x)\rho_{(r)}(x) + E_{\infty(g)}(x)\rho_{(g)}(x) + E_{\infty(b)}(x)\rho_{(b)}(x)]e^{-\beta d(x)} \quad (15)$$

$$F(x) = (E_{\infty(r)}(x) + E_{\infty(g)}(x) + E_{\infty(b)}(x))(1 - e^{-\beta d(x)}) \quad (16)$$

In the above, the sum of the tristimulus values equals 1, such that:

$$\Sigma IC_{(C)}(x) = IC_{(r)}(x) + IC_{(g)}(x) + IC_{(b)}(x) = 1 \quad (17)$$

$$\Sigma LC_{(C)}(x) = LC_{(r)}(x) + LC_{(g)}(x) + LC_{(b)}(x) = 1 \quad (18)$$

$$\Sigma OC_{(C)}(x) = OC_{(r)}(x) + OC_{(g)}(x) + OC_{(b)}(x) = 1 \quad (19)$$

Generally the above tristimulus values are used to change color information of the image to enhance the low visibility of the image degraded by fog, which first requires estimation of the attenuation coefficient and the airlight. Accurate coefficients must be estimated to estimate $LC_{(c)}(x)$, so as to achieve a good restoration effect. Errors in estimation cause color fluctuations in the image due to inaccurate estimation of $LC_{(c)}(x)$. And, in the presence of moving objects, $LC_{(c)}(x)$ estimation must be different from a previous image. Thus, visual image color fluctuations become more apparent.

Thus, the embodiments improve $F(x)*LC_{(c)}(x)$ to $E'_{(I)}*LC_{(rgb)}$. Keeping $LC_{(rgb)}$ constant, only airlight $E'_{(I)}$ is estimated, which solves the color fluctuation problem.

3.3 Estimating Airlight

As the image is foggy, visibility is typically weak. Thus, brightness of the image is increased to best lower the influence of fog, and achieve the goal of restoring the image. Thus, stimulus value of the light chromaticity (LC) is use to obtain airlight. Namely, the visibility $E'_{(c)\_max}$ obtainable for every pixel is:

$$E_{(c)\_max}' = E_{(c)}/LC_{(c)} \quad (20)$$

In equation (20), subscript (c) represents color channel, namely the three color channels: R, G, and B. Thus, when visibility is increased, color information is increased.

As airlight intensity increases, image color, brightness, and contrast become more apparent. Here, the embodiment may adopt the intensity (I) of the HSI (Hue, Saturation, Intensity) color model to represent image brightness intensity. Intensity (I) is used because information obtained is average value of the three colors: R, G, and B. As shown in equation (21) below, intensity (I) is similar to airlight intensity information. So, by converting the intensity to $E'_{(I)\_max}$, required visibility intensity information is found as:

$$E'_{(I)\_max} = \frac{E'_{(r)\_max} + E'_{(g)\_max} + E'_{(b)\_max}}{3} \quad (21)$$

Because visibility intensity information of each pixel value is not strong, the method sets a threshold for the estimated intensity information. As shown in equation (22), Image_avg represents average of all pixels in the image, as:

$$E_{(I)}'\_threshold = (255 + Image\_avg) \quad (22)$$

Final $E'_{(I)}$ is determined according to rules of equation (23) as:

If $(E'_{(I)\_max} > E'_{(I)\_threshold})$ (23)

$E'_{(I)} = E'_{(I)\_threshold}$

Else $E'_{(I)} = E'_{(I)\_max}$

3.4 Estimating Attenuation Coefficient

Because the attenuation coefficient $e^{-\beta d(x)}$ has the most important influence on the foggy image, degree of influence of the attenuation must be determined before a restoration equation for restoring the image may be derived. The tristimulus values may be used to estimate the attenuation coefficient. As described above, because $E'_{(I)} * LC_{(rgb)}$ represents the atmospheric scattering coefficient, and is consistent with the equation obtained by merging equations (12) and (16), the following identity may be derived:

$$E'_{(I)} * LC_{(rgb)}(x) = [(E_{\infty(r)}(x) + E_{\infty(g)}(x) + E_{\infty(b)}(x))(1 - e^{-\beta d(x)})] \quad (24)$$

$$\frac{E_{\infty(c)}(x)}{E_{\infty(r)}(x) + E_{\infty(g)}(x) + E_{\infty(b)}(x)}$$

Cancelling $E\infty(r)+E\infty(g)+E\infty(b)$ in the above equation, the estimated $E'_{(I)}$ is used to obtain equation (25) as:

$$E_{(I)}'* LC_{(C)}(x) = (1 - e^{-\beta d(x)}) * E_{\infty(c)}(x) \quad (25)$$

Through the following derivation, equation (25) may be used to obtain the attenuation coefficient $e^{-\beta d(x)}$ as follows:

$$E'_{(I)} * \left( \frac{LC_{(r)}(x) + LC_{(g)}(x) + LC_{(b)}(x)}{3} \right) = (1 - e^{-\beta d(x)}) * E_{\infty(c)}(x)$$

$$E'_{(I)} * \left( \frac{LC_{(r)}(x) + LC_{(g)}(x) + LC_{(b)}(x)}{3} \right) = E_{\infty(c)}(x) - E_{\infty(c)}(x) * e^{-\beta d(x)}$$

$$E_{\infty(c)}(x) * e^{-\beta d(x)} = E_{\infty(c)}(x) - E'_{(I)} * \left( \frac{LC_{(r)}(x) + LC_{(g)}(x) + LC_{(b)}(x)}{3} \right)$$

$$e^{-\beta d(x)} = 1 - E'_{(I)} * \left( \frac{LC_{(r)}(x) + LC_{(g)}(x) + LC_{(b)}(x)}{3 * E_{\infty(c)}(x)} \right)$$

Because $\Sigma LC_{(C)}(x) = LC_{(r)}(x) + LC_{(g)}(x) + LC_{(b)}(x) = 1$, the attenuation coefficient $e^{-\beta d(x)}$ can be obtained as:

$$e^{-\beta d(x)} = \left[ 1 - \left( \frac{E'_{(I)}}{3 * E_{\infty(c)}(x)} \right) \right] \quad (26)$$

And, $$e^{\beta d(x)} = \frac{1}{e^{\beta d(x)}}.$$

From the above equation, enhancement coefficient $e^{\beta d(x)}$ is obtained through reverse derivation of the attenuation coefficient.

3.5 Improved Image Restoration Equation

After calculating $E_{(I)}'$ and $e^{\beta d(x)}$, restoration may be performed. First, an influence equation obtained by using knowledge of the chromaticity is derived, then an inverse transformation of equation (14) produces the image restoration equation as:

$$E_{(restore)}(x) = [E(x) - F(x) * LC_{(C)}(x)] * e^{\beta d(x)} \quad (27)$$

In the above, mention is made of $LC_{(c)}$ being calculated for each color: R, G, and B. When processing a single image, this method can be used. However, if the visible image is filtered out, image color will be unstable. For example, the image may have a red bias or a blue bias. Thus, $LC_{(c)}$ is improved to $LC_{(rgb)}$ as:

$$LC_{(rgb)}(x) = \frac{LC_{(r)}(x) + LC_{(g)}(x) + LC_{(b)}(x)}{3} \quad (28)$$

In this way, by obtaining average of the stimulus values of the three colors (R, G, and B), color fluctuation can be resolved. In other words, the image restoration equation is improved to:

$$E_{(restore)}(x) = [E(x) - E_{(I)}'* LC_{(rgb)}(x)] * e^{\beta d(x)} \quad (29)$$

3.6 Enhancing Image Chroma and Luminance

Although equation (29) is already able to perform image restoration processing, the resulting image will exhibit low chroma, making colors of the image less vivid, and saturation of the image insufficient following fog removal. The method may further convert the enhanced image to YCbCr color space to enhance Cb and Cr values of the image. Because a 50% increase makes the image over-vivid, such that colors exhibit hue bias, the image obtained after restoration through equation (29) is converted to YCbCr color space, and Cb and Cr values of the image are increased by k % to increase chroma of the image. If k is too small, chroma will be insufficient; if k is too large, chroma will be over-vivid, causing hue bias.

The image resulting from image restoration processing through equation (29) will also exhibit a decrease in luminance. Thus, the method also utilizes an improved histogram equalization method to increase luminance of the resulting image. First, the R, G, and B channels of the image are separated into gray-level images. Then, a probability density function is statistically determined for the gray-level histogram of each color channel. Then, weightings of probability distribution graphs of original brightness of the image are redistributed as follows:

$$P_n(k) = \begin{cases} TH & \text{if } P(k) \geq TH \\ (P(k)/TH)^r * TH & \text{if } 0 < P(k) < TH \\ 0 & \text{if } P(k) \leq 0 \end{cases} \quad (30)$$

Figure 10:
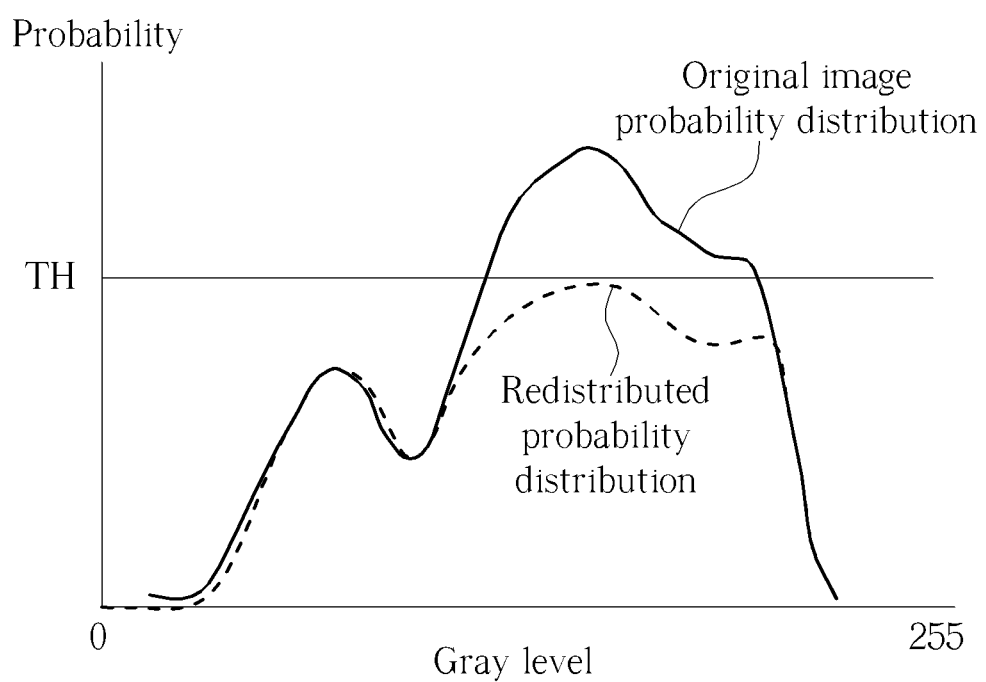
FIG. 10 is a diagram illustrating probability density adjustment.

In the above, TH is a threshold for adjusting the probability density function $P(k)$ of the histogram of each channel, as shown in FIG. 10. $P_n(k)$ in equation (30) above represents the redistributed probability density function, r represents value for adjusting the probability density function, where r is in a range from 0 to 1, and can be found as:

$$r = \begin{cases} 1.0 - ((S\_\mu + \sigma)/m) & \text{if } (S\_\mu + \sigma) < m \\ 0 & \text{if } (S\_\mu + \sigma) > m \end{cases} \quad (31)$$

In equation (31), $S\_\mu$ is the Sobel image mean, $\sigma$ is the standard deviation of the original image, and m is the threshold set.

By redistributing the weightings of the probability distribution graph of the original brightness of the image as described above (shown in FIG. 10), then performing histogram equalization, luminance of the resulting image from equation (29) is increased.

In order to improve upon the weaknesses of the prior art, including time consumption and need to reference images captured at different times, the cleaning method for foggy images based on atmospheric scattering theory and color analysis is provided. The method may be used to remove fog from real-time visual images, and is applicable at least to intelligent visual monitoring systems and transportation vehicle visual monitoring systems. For example, a single camera or multiple cameras may be mounted on a ship, and fog removal may be accomplished through use of atmospheric scattering theory and color analysis applied to captured images. Then, the cleaned images may be displayed in a display to aid in navigation. The method may be based on performing an improved exponential image contrast enhancement on an RGB color module and tristimulus values to enhance low-visibility images caused by fog. The method may utilize an RGB color model of the image to analyze color information of each RGB color channel of the image. Brightness information of scattered light caused by fog may be performed through a Lambert-Beer physics model. Tristimulus values of red, blue, and green may be analyzed. Then, exponential contrast enhancement processing is performed by utilizing a dichromatic atmospheric scattering model. In this way, fog can be removed from the image effectively, restoring faded color of the image, and further obtaining original image color information to improve marine transportation safety. In addition, the cleaning method can also eliminate influence of pervasive fog in road images to improve traffic image monitoring systems, so that more accurate image information can be obtained. The cleaning method may also be applied in automobile cameras to remove fog and clear up a driver's view to increase traffic safety.

Those skilled in the art will readily observe that numerous modifications and alterations of the device and method may be made while retaining the teachings of the invention.

What is claimed is:

1. A cleaning method for foggy images, comprising:
using a stimulus value of a light chromaticity (LC) of an input image to generate an airlight luminance;
using red-green-blue (RGB) tristimulus values of the input image to generate an attenuation coefficient;
using the airlight luminance and the attenuation coefficient to recover the input image for generating a primary reduction image;
transforming the primary reduction image into YCbCr color model and boosting values of Cb and Cr values of the primary reduction image by a predetermined percentage to enhance chromaticity of the primary reduction image;
redistributing weighting of a probability density function of an RGB gray level histogram after enhancing chromaticity of the primary reduction image, wherein redistributing weight of the probability density function of the RGB gray level histogram is performed according to:

$$P_n(k) = \begin{cases} TH & \text{if } P(k) \geq TH \\ (P(k)/TH)^r * TH & \text{if } 0 < P(k) < TH \\ 0 & \text{if } P(k) \leq 0 \end{cases}$$

where TH is a threshold value, $P_n(k)$ is the redistributed probability density function, r is a value used for redistributing the probability density function, r is between 0 and 1, and r is generated through the following equation:

$$r = \begin{cases} 1.0 - ((S\_\mu + \sigma)/m), & \text{if } (S\_\mu + \sigma) > m \\ 0 & \text{if } (S\_\mu + \sigma) < m \end{cases}$$

where $S\_\mu$ is a mean value of the Sobel image, $\sigma$ is a standard deviation of the input image, and m is a threshold value for r; and
enhancing luminance of the primary reduction image through histogram equalization after enhancing chromaticity of the primary reduction image to generate a final reduction image.

2. The method of claim 1, further comprising:
dividing a sum of RGB stimulus values of the input image by 3 to generate the stimulus value of the light chromaticity to generate the primary reduction image with stable color.

3. The method of claim 1, wherein using the airlight luminance and the attenuation coefficient to recover the input image comprises:
substituting the airlight luminance and the attenuation coefficient into an exponential contrast enhancement equation to enhance the low-visibility input image caused by fog; and
using the physical model of the dichromatic atmospheric scattering theory to execute the exponential contrast enhancement on the input image.

4. The method of claim 1, wherein when redistributing weighting of the probability density function of an RGB gray level histogram after enhancing chromaticity of the primary reduction image, statistically determining a probability density function a gray-level histogram of each color channel.

* * * * *